United States Patent [19]
Chang et al.

[11] Patent Number: 5,230,049
[45] Date of Patent: Jul. 20, 1993

[54] PROGRAM SOURCE CODE TRANSLATOR

[75] Inventors: Philip Y. Chang; Daniel J. Coyle, Jr.; Dan C. Hargrove; Domingo S. Hidalgo, all of Austin, Tex.

[73] Assignee: International Business Machines Corporation, Armonk, N.Y.

[21] Appl. No.: 277,367

[22] Filed: Nov. 29, 1988

[51] Int. Cl.[5] .................................................. G06F 9/45
[52] U.S. Cl. ..................................... 395/700; 395/500; 364/DIG. 1; 364/280; 364/280.4
[58] Field of Search ......... 364/200, 900, 300, DIG. 1, 364/DIG. 2; 395/700, 500

[56] References Cited

U.S. PATENT DOCUMENTS

| | | | |
|---|---|---|---|
| 4,604,686 | 8/1986 | Reiter et al. | 364/200 |
| 4,667,290 | 5/1987 | Goss et al. | 364/300 |
| 4,712,189 | 12/1987 | Mohri | 364/900 |
| 4,734,854 | 3/1988 | Afshar | 364/200 |
| 4,742,467 | 5/1988 | Messerich et al. | 364/200 |
| 4,791,550 | 12/1988 | Stevenson et al. | 364/200 |
| 4,791,558 | 12/1988 | Chaitin et al. | 364/200 |
| 4,809,170 | 2/1989 | LeBlang et al. | 364/200 |
| 4,819,160 | 4/1989 | Tanka et al. | 364/200 |
| 4,829,427 | 5/1989 | Green | 364/300 |
| 4,864,503 | 9/1989 | Tolin | 364/300 |
| 4,894,771 | 1/1990 | Kunii et al. | 364/300 |

OTHER PUBLICATIONS

Arvola Chan, et al., *An Ada-Compatible Distributed Database Management System* Proceedings of the IEEE, vol. 75, No. 5, May 1987, pp. 674-694.

D. D. Chamberlin, et al., *Support for Repetitive Transactions and Ad Hoc*, ACM Transactions on Database Systems, vol. 6, No. 1 Mar. 1981, pp. 70-94.

Jorg Noack, et al., MEMOPASCAL: *Embedding a Query Language Into a High Level Programming Language*, Applied Informatics, vol. 29, No. 4, Apr. 1987, pp. 149-156.

D. D. Chamberlain et al., SEQUEL 2: *A Unified Approach to Data Definition, Manipulation, and Control*, IBM Journal of Research and Development, vol. 20, No. 6, Nov., 1976, pp. 570 to 572.

Primary Examiner—Paul V. Kulik
Attorney, Agent, or Firm—Kenneth C. Hill; Andrew J. Dillon

[57] ABSTRACT

A pre-compiler for a host programming language contains a language dependent portion and a language independent portion. The language dependent portion extracts source file statements written in a supplemental language and converts them into a language independent format. The language independent statements are communicated to the language independent portion, which translates them into lists of tasks to be performed. These tasks are communicated back to the language dependent portion in a language independent format. The language dependent portion then translates the tasks into procedure calls in the host language.

15 Claims, 2 Drawing Sheets

PROGRAM SOURCE CODE TRANSLATOR

BACKGROUND OF THE INVENTION

1. Technical Field

The present invention relates generally to compilers and translators for digital computer systems, and more specifically to pre-compilers for translating portions of a program source file prior to its compilation into executable code.

2. Background Art

Whenever possible, computer programmers should avoid writing new computer code to solve problems which have already been solved. Therefore, it is common for programmers to utilize previously written subprograms and utilities in order to accomplish various portions of their current programming task. Judicious use of subprogram libraries allow a programmer to create a correct, working program in much less time than required for one containing all new code.

In some fields, large systems have been created which are available for use by the programmer. This is true, for example, in the area of database systems. Instead of writing a large number of file access procedures, a programmer needing to utilize database functions in his program can invoke a library of available database management procedures. These procedures typically handle all of the details of accessing and updating database files. It is only necessary for the programmer to invoke library routines through high level subprogram calls, thus allowing the programmer to concentrate on the remaining parts of his task.

Database management systems are generally invoked using sequences of commands which are not valid programming statements in the language being used for development. For example, several well known database management systems accept commands in a formalized notation known as Structured Query Language (SQL). SQL is a command interface designed specifically for database processing functions. SQL commands are substantially different in format from programming statements used in languages such as C and COBOL.

In order to allow a programmer to include SQL commands in his application program, which is written in a language such as C, it is necessary to scan the program source code of the C program and translate all SQL commands into a format which can be understood by a C compiler. This is generally done using a pre-compiler, which accepts as input a program source file including both C code and SQL statements, and which generates an equivalent modified source file which contains only C source code. This modified source file can then be compiled by a C compiler to produce executable code.

The pre-compiler is required to understand SQL statements, and to be able to translate them to equivalent source code statements in the host programming language. Each programming language which includes embedded SQL statements must use a different pre-compiler; for example, separate pre-compilers must be written for each of the languages FORTRAN, C, Pascal, COBOL and Ada. Since the syntax and even the semantics of these and other languages are different, an appropriate pre-compiler for each language must be written nearly from scratch.

The effort and expense necessary to create a pre-compiler is quite large. This is because it is necessary for the pre-compiler to understand SQL statements as well as those of the host language. If any low level features of SQL are ever changed, it is necessary to rewrite portions of every pre-compiler.

It would therefore be desirable to provide a mechanism which would simplify the writing of pre-compilers, and simplify the maintenance thereof if changes are made to the underlying program.

SUMMARY OF THE INVENTION

It is therefore an object of the present invention to provide a translator for computer source code which simplifies the writing of pre-compilers. It is a further object of the present invention to allow pre-compilers to be written without requiring detailed knowledge of an underlying, supplemental system.

Therefore, in order to accomplish these and other objects and advantages, a pre-compiler for host language programs which can contain embedded statements in a supplemental language is separated into two major portions. One portion is independent of the host language being processed; supplemental language statements are passed to it in a formalized, language independent format. This language independent portion is responsible for parsing the language independent statements and generates a list of tasks which represent calls to a run time library.

The other portion of the pre-compiler is dependent upon the identity of the host language to be processed. It locates supplemental language statements in a host language program, transforms them into the language independent format, and communicates the transformed statements to the language independent portion. The language dependent portion receives the task list generated by the language independent portion and generates appropriate source code procedure calls to the run time library.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
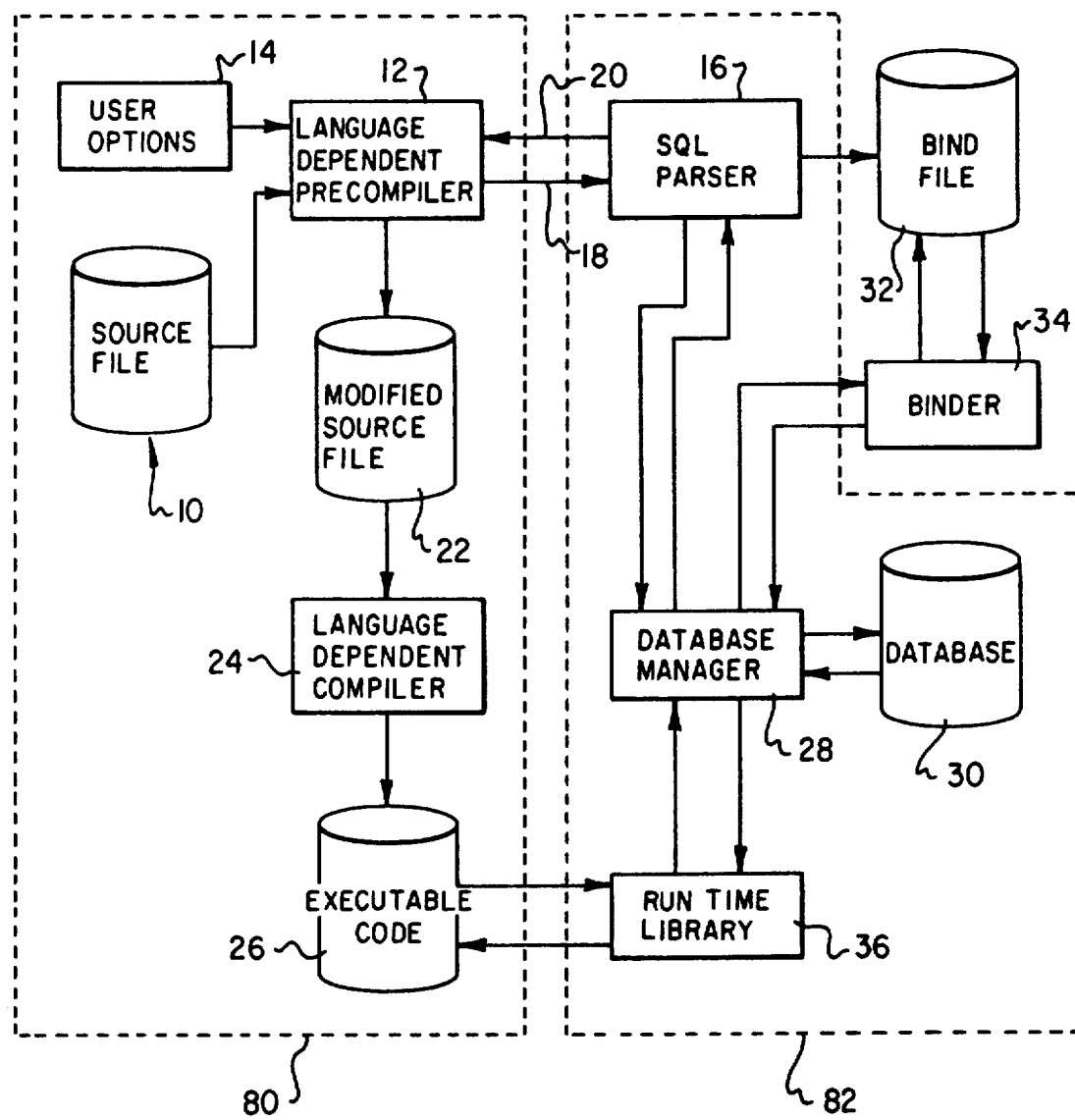
FIG. 1 is a block diagram of a pre-compiler system according to the present invention.

FIG. 1 is a block diagram of a system for converting program source code into executable code. The program source code includes statements in a host language and statements in a supplemental language. For purposes of this description, the supplemental language discussed will be SQL.

A source file 10 contains program source code primarily written in the host language, such as COBOL or C. The source file is input to a language dependent pre-compiler 12, as are a set of user options 14 typically used to define the expected run time environment for an executable version of the source file 10. The language dependent pre-compiler 12 communicates with an SQL parser 16 by sending SQL commands thereto in a language independent format on line 18, and receiving therefrom a corresponding list of tasks to be performed on line 20. The received task list identifies sequences of calls to library procedures which must be made in order to implement the communicated SQL statements. The pre-compiler 12 translates these tasks into procedure calls in the host language, and places them in a modified source file 22. Source statements in the host language which are read from the source file 10 are simply copied to the modified source file 22.

Thus, after a precompilation phase is completed, the modified source file 22 contains all of the original source statements in the host language, and sequences of procedure calls in the host language which have been substituted for SQL statements in the source file 10. The modified source file 22 can then be compiled by a host language compiler 24 as known in the art, resulting in executable code 26. Depending upon the details of the system implementation, this compilation step can actually involve several substeps, such as compilation of the modified source file into object code, and linking of the object code with standard code from external libraries.

It is not necessary for the language dependent pre-compiler 12 to be able to perform compilation of the SQL code. It is only necessary for the pre-compiler 12 to be able to translate the SOL statements into a predetermined, language independent format, which is a relatively straightforward process In addition, converting the returned task list into host language procedure calls is also a straightforward process. Thus, it is possible for a person implementing a pre-compiler 12 to have no knowledge whatsoever of the internals of SQL. In addition, minor changes within the internals of SQL have no effect on the language dependent pre-compiler 12.

The SQL parser 16 is responsible for parsing the received, formalized SQL statements and creating a list of tasks which must be performed at run time to process each SQL statement. The task list is transmitted back to the language dependent pre-compiler 12 in a standard, language independent format. Thus, it is not necessary for the SQL parser 16 to have any knowledge of information which is specific to the host language. In fact, it is possible for a single SQL parser 16 to be used with any number of different host language dependent pre-compilers 12.

In order to convert the received SQL statements into task lists, the SQL parser 16 may need to access a database manager 28, which is the underlying system which interfaces with a database 30. The database manager 28 is responsible for all accesses and updates to the database 30 in order to ensure data integrity. An SQL statement which is to be executed at run time is sent to the database manager 28 for compilation into an access plan as known in the art. SQL statements which do not cause actual database access can be handled in the SQL parser 16.

Since it is necessary for SQL commands embedded in the source file 10 to contain references to host language variables, the pre-compiler 12 also communicates to the SQL parser 16 the identities of all variables which are used in SQL statements. These variables are preferably declared in SQL variable declaration sections, delimited by SQL statements defining the beginning and end of each section. All variables declared within these sections are communicated to the SQL parser 16 in a language independent format, which includes the variables' SQL type, data size, and a unique token identifier. The source statements for the variable declarations remain, and are copied to the modified source file 22. The SQL parser 16 uses the transmitted declarations in its parses, and communicates them to the database manager 28 for use in building access plans.

A bind file 32 and binder routine 34 can be used when it is desired to delay creation of the access plans. The variable declarations and SQL statements received from the language dependent pre-compiler 12 are copied to the bind file 32 as they are received. The SQL parser 16 and database manager 28 perform their usual functions. However, if it is desired to delay creating the access plans, which would typically be indicated as one of the user options 14, the database manager 28 does not actually write the access plans to the database 30. This situation might be used to simply check the syntax of the source file 10 during software development.

At some later time, after precompilation has been completed, the binder 34 can be invoked to process the bind file 32. The binder 34 performs the same operations as the SQL parser 16 performs during precompilation, and generates an identical access plan. Use of the bind file 32 is simply a convenience to the user to allow delayed creation of access plans.

A run time library 36 includes routines which access the database manager 28 when the executable code 26 is being executed. The task lists returned by the SQL parser 16 include instructions which cause host language variables to be passed to the run time library 36 in a standard format prior to invoking run time library routines which in turn invoke the database manager 28. The run time library 36 consists of all the procedures necessary to access the database 30 through the database manager 28. The actual code of the run time library 36 can be linked directly into the executable code 26, or may be resident at any location within the system which can be accessed by procedure calls from the executable code 26.

The run time library 36 typically includes procedures to allocate and deallocate data areas for use by the database manager 28, and to execute database access plans. It also includes procedures for handling errors which may arise during database 30 access. In multiprocessing systems, it may be necessary to limit access to the database 30 to a single process at a time. This can be done using semaphores, as known in the art, which are set and reset using procedure calls to the run time library 36.

Figure 2:
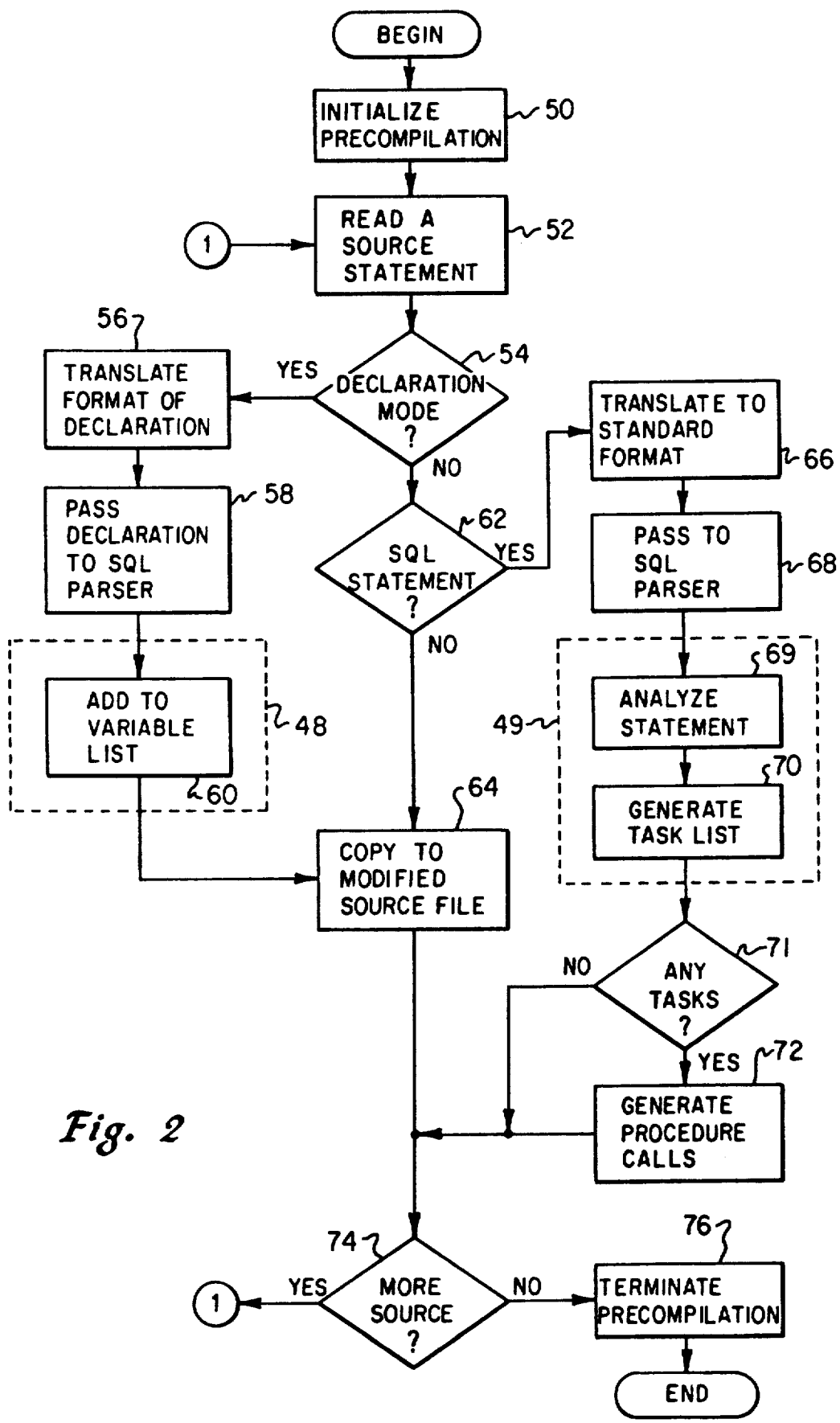
FIG. 2 is a flowchart illustrating operational steps performed by the system of FIG. 1.

FIG. 2 shows a flow chart which describes the precompilation steps undertaken by the language dependent pre-compiler 12 and the SQL parser 16. Steps contained within the dashed boxes 48, 49 are performed by the SQL parser 16, and the remaining steps are performed by the pre-compiler 12. When the pre-compiler 12 is invoked, it is initialized (step 50) with user options and system dependent information. This step also includes initialization of the SQL parser 16.

Next, a program source code statement is read from the source file (step 52). If the pre-compiler is in SQL declaration mode (step 54), which occurs when a begin declaration SQL statement has been processed and no corresponding end declaration SQL statement has been processed, the next statement will be an SQL data declaration. The pre-compiler 12 translates the declaration (step 56) into a standard format which includes the variable's SQL type, data length, and a unique token assigned by the pre-compiler 12. The declaration is passed to the SQL parser (step 58), which adds it (step 60) to the variable list maintained by the SQL parser 16. The original declaration is also copied to the modified source file (step 64).

If the current source statement was not a data declaration, it is checked to see if it is an SQL statement (step 62). If it is not, it is copied unchanged to the modified source file (step 64). If the current statement is an SQL statement, it is translated to the language independent format (step 66), and passed to the SQL parser (step 68).

Within the SQL parser 16, the SQL statements are analyzed using common parsing techniques (step 69). A task list corresponding to the SQL statement is generated (step 70) and returned to the pre-compiler 12. Some SQL statements do not require any run time tasks to be performed. If there are any tasks to be performed (step 71), the pre-compiler 12 generates the corresponding procedure calls (step 72) in the host language.

In all cases, the next step is to determine whether more source statements are available (step 74) in the source file 10. If such is the case, flow of control returns to step 52 and the next source statement is read. Once the source file has been exhausted, precompilation is terminated (step 76) and the precompilation process ends.

As is easily seen in FIG. 1, the process of translating source code into executable code is performed by two independent portions 80, 82 of this system. The left-hand portion 80 of the overall system is dependent upon which host language is being compiled. The right-hand portion 82 is completely independent of the identity of the host language, and the two portions communicate only by passing language independent information in a predefined format. Thus, the language dependent portion 80 can be implemented to support any desired programming language without affecting the language independent portion 82. Likewise, changes can be made to the internal functions of the language independent portion 82 without affecting the operation of the language dependent portion 80.

Although the language independent portion has been described as an SQL compiler, other systems could be used. For example, drivers for plotters or other devices which have a command language of their own may be implemented in a similar fashion. This allows a single compiler and run time library to be written for such devices, with standard interfaces being used for all languages.

While the invention has been particularly shown and described with reference to a preferred embodiment, it will be understood by those skilled in the art that various changes in form and detail may be made therein without departing from the spirit and scope of the invention.

We claim:

1. A method for translating a program source file on a computer system, comprising the steps of:
   supplying a source file containing host language statements, and containing supplemental language statements which are not valid host language statements, to a language specific translator;
   within the language specific translator, copying the host language statements to a modified source file;
   translating the supplemental language statements into a language independent format;
   communicating the translated supplemental language statements to a separate translator;
   in the separate translator, translating the translated supplemental language statements into lists of tasks necessary to perform the supplemental language statements, and returning a language independent list of tasks to the language specific translator; and
   translating the returned tasks into host language statements, and writing such host language statements to the modified source file.

2. The method of claim 1, further comprising the step of
   (e) compiling the modified source file into an executable file.

3. The method of claim 1, wherein the host language statements created in said returned tasks translating step comprise subprogram calls to a database manager system.

4. A system for translating program source code, comprising:
   a language independent translator for translating supplemental language statements in a first language independent format into a list of tasks in a second language independent format; and
   a language specific translator, connected to said language independent translator for communicating information therewith, for selecting supplemental language statements from an input file containing a plurality of program source code statements in a language specific to said language specific translator, for converting such supplemental language statements into the first language independent format, for communicating the converted supplemental language statements to said language independent translator, for receiving the list of tasks from said language independent translator, and for converting the list of tasks from the second language independent format into program source code statements in the language specific to said language specific translator.

5. The system of claim 4, further comprising:
   a compiler for translating the program source code statements generated by said language specific translator into code executable on a computer system.

6. The system of claim 4, wherein the selected supplemental language statements are database accessing commands.

7. The system of claim 6, wherein the database accessing commands are SQL commands.

8. The system of claim 4, wherein said language specific translator translates the list of tasks received from said language independent translator into sequences of subprogram calls in the language specific to said language specific translator.

9. The system of claim 4, wherein the list of tasks includes tasks for accessing a database through a database manager system, and tasks for responding to errors which may arise during database access.

10. A method for precompiling, on a computer system, a program source file containing host language statements and supplemental language statements, comprising the steps of:
   (a) initializing a host language specific pre-compiler with user information and options;
   (b) initializing a supplemental language pre-compiler with information obtained from the host language specific pre-compiler;
   (c) within the host language specific pre-compiler, processing the program source file to copy host language statements to a modified source file and to extract supplemental language statements;
   (d) converting the extracted supplemental language statements to a format which is independent of the host language, and communicating them to the supplemental language pre-compiler;

(e) within the supplemental language pre-compiler, parsing the converted supplemental language statements, generating a corresponding list of tasks necessary to perform the supplemental language statements, and communicating the list of tasks back to the language specific pre-compiler;

(f) within the host language specific pre-compiler, translating the list of tasks into host language statements; and (g) writing the host language statements formed in step (f) to the modified source file.

11. The method of claim 10, wherein the supplemental language is a database accessing language.

12. The method of claim 11, wherein the database accessing language is SQL.

13. The method of claim 10, wherein step (f) comprises translating each task into a host language procedure call to a database manager.

14. The method of claim 13, wherein the database manager is an SQL database engine.

15. The method of claim 10, further comprising the step of:

(h) compiling the modified source file into executable code.

* * * * *